United States Patent [19]
Woltjer et al.

[11] Patent Number: 5,191,967
[45] Date of Patent: Mar. 9, 1993

[54] CONVEYOR SYSTEM HAVING NON-SINGULATING ACCUMULATION CONVEYOR

[75] Inventors: Bernard H. Woltjer, Jenison; Arthur J. Terpstra, Jr., Allendale, both of Mich.

[73] Assignee: Rapistan Corp., Grand Rapids, Mich.

[21] Appl. No.: 605,544

[22] Filed: Oct. 30, 1990

[51] Int. Cl.$^5$ ............................................. B65G 13/06
[52] U.S. Cl. ...................................... 198/781; 198/783
[58] Field of Search ............... 198/781, 460, 782, 783, 198/789, 790

[56] References Cited

U.S. PATENT DOCUMENTS

| | | | |
|---|---|---|---|
| 3,420,355 | 1/1969 | DeGood et al. | |
| 3,612,248 | 10/1971 | Wallis | 198/781 |
| 3,724,642 | 4/1973 | DeGood | 198/127 |
| 3,730,330 | 5/1973 | DeGood | 198/127 |
| 3,768,630 | 10/1973 | Inwood et al. | 198/127 |
| 3,770,102 | 11/1973 | DeGood | 198/127 |
| 3,967,718 | 7/1976 | Monahan | 198/781 X |
| 4,109,783 | 8/1978 | Vogt | 198/781 |
| 4,174,777 | 11/1979 | Riehle | 198/781 |
| 4,264,004 | 4/1981 | Harwick | 198/781 |
| 4,273,239 | 6/1981 | Thwaites et al. | 198/781 |
| 4,383,605 | 5/1983 | Harwick | 198/781 |
| 4,441,607 | 4/1984 | Bowman et al. | 198/781 |
| 4,534,462 | 8/1985 | Hoover et al. | 198/781 |
| 4,562,920 | 1/1986 | Jaffre | 198/781 |
| 4,817,784 | 4/1989 | Judge | 198/781 |
| 4,919,255 | 4/1990 | Morgan et al. | 198/781 |
| 5,016,748 | 5/1991 | Garzelloni | 198/781 |
| 5,058,727 | 10/1991 | Jahns et al. | 198/460 |
| 5,060,785 | 10/1991 | Garrity | 198/781 |

OTHER PUBLICATIONS

European Search Report EP 91 30 9972.
English language translation of German Patent Document 34 43 944 Cl.
English language translation of Netherlands Patent Disclosure 7,908,787.
English language translation of Abstract of Austrian Patent Document 384,003 B.

*Primary Examiner*—Joseph E. Valenza
*Assistant Examiner*—Tuan N. Nguyen
*Attorney, Agent, or Firm*—Price, Heneveld, Cooper, DeWitt & Litton

[57] ABSTRACT

A conveyor system includes an accumulation conveyor that is particularly useful in a location outbound of a sortation spur in combination with a receiving conveyor which receives products from the accumulation conveyor at a generally constant rate. The accumulation conveyor includes a plurality of powered rollers that are selectively actuatable in groups of tandemly arranged zones in order to convey product to the receiving conveyor. A product sensor associated with each zone senses the presence of product in that zone, and a control that is responsive to the product sensor actuates all of the rollers associated with zones upstream of any sensor that is not sensing product in order to transport product to the receiving conveyor without singulation, yet provide an accumulation capability. The control is pneumatic and uses pilot-actuated valves configured in a manner that connects the associated roller drive actuator directly with a source of pneumatic fluid in order to provide an exceptionally responsive control.

15 Claims, 5 Drawing Sheets

CONVEYOR SYSTEM HAVING NON-SINGULATING ACCUMULATION CONVEYOR

BACKGROUND OF THE INVENTION

This invention relates generally to accumulation conveyors and to conveyor systems incorporating such accumulation conveyors. More particularly the invention relates to pneumatically controlled accumulation conveyors. The invention is especially useful with conveyor systems having sortation means and accumulation conveyors outbound of the sortation means.

Newer warehouse conveyor systems are called upon to process inventory at an ever increasing rate of throughput. In other words, the industry standard for product throughput increases almost yearly. In order to meet these demanding specifications, designers typically increase line speeds. However, as line speeds become progressively higher, increasing them further comes at an ever increasing cost. Special bearings are required for the myriad of power rollers and line noise becomes a more significant problem. Therefore, the need exists for techniques to increase system throughput without a commensurate increase in line speed.

In warehouse conveyor systems, outgoing product is sorted at a sortation conveyor into orders destined for particular customers. Each order is typically diverted to a sortation spur designated by the conveyor management system for that customer and from the spur to a holding area or directly to a transportation vehicle. As long as product is fairly well mixed, each spur will receive product at a rate that is roughly equal to the rate at which the product is discharged at the end of the outbound conveyor. However, situations arise where a large number of consecutive, or closely grouped, products are designated for one spur, which momentarily increases the rate at which products are fed into the outbound conveyor. In order to accommodate the variation in product feed rate, the outbound conveyor typically has had to run at exceptionally high rate.

Various forms of accumulation conveyors are known in the art. An automatic pneumatically controlled accumulation conveyor is disclosed in commonly assigned U.S. Pat. No. 3,768,630 issued to Russell A. Inwood et al. for an ACCUMULATOR WITH AUTOMATIC OVERRIDE in which groups of selectively powered rollers are organized into zones and each zone is controlled by an actuator responsive either to a sensing roller positioned within the zone or to a clear-out valve. In an accumulation mode, a case stop is raised and cases accumulate behind the stop. Cases continue to move toward downstream zones until they accumulate to the point of actuating a sensing roller. When this occurs, the associated zone is de-activated such that cases in that zone are no longer propelled. In a clear-out mode, a clear-out valve is actuated in order to power all of the zones and the case stop is lowered to propel the cases off of the accumulating conveyor.

While the Inwood et al. '630 patent recognized the desirability of keeping articles closely spaced, it accomplished the result using a shuttle valve associated with each zone which received its operating pressure in the appropriate circumstances from a series path extending through one or several downstream shuttle valves. During a clear-out mode, all zones are actuated through such series path. The result is a sluggish response to changes in operating condition. Furthermore, such accumulation conveyor is taught in Inwood et al. for use in an application in which articles would accumulate behind a case stop until cleared out in a "slug" by a clear-out command from a central control system. While such function is useful in the product input portion of a conveyor system, it does not solve the problem attendant to the sortation systems in which product may be received in slugs but which need to be discharged at a controlled, generally constant, rate.

SUMMARY OF THE INVENTION

Accordingly, there remains a need for an accumulation conveyor useful in applications where the conveyor receives product at an inconsistent rate and discharges the product at a generally constant rate and that will accumulate product as required but will provide a constant through-put across the accumulation conveyor at all other times without creating singulation between the product.

The present invention provides a conveyor system having an accumulation conveyor, product input means for discharging product to the accumulation conveyor and product output means for receiving product from the accumulation conveyor at a generally constant rate. The accumulation conveyor includes a plurality of conveying means arranged in tandem and selectively actuatable in order to convey product from the input means to the output means. Product sensing means associated with certain conveying means senses the presence of product in the vicinity of that conveying means. Control means that is responsive to the product sensing means includes means for actuating all of the conveying means upstream of any sensing means that is not sensing product.

In this manner, a conveyor system having an accumulation conveyor provided according to the teachings of the invention will perform as a powered conveyor section upstream of any sensing means that senses the absence of product and as an accumulation section downstream of such sensing means. Unnecessary singulation is avoided.

An accumulation conveyor according to another aspect of the invention includes a multiplicity of conveying rollers grouped into adjacent zones with drive means for each zone that is actuated by actuating fluid. Control means supplies actuating fluid to actuate the drive means for a zone if a product sensing means associated with the zone does not sense the presence of product. The control means further includes anti-singulation means responsive to downstream product sensing means to actuate the drive means of an associated zone if any of the downstream product sensing means do not sense the presence of product. The anti-singulation means includes means for connecting the associated drive means directly to a source of actuating fluid. In this manner, exceptionally responsive control is provided in a pneumatic or hydraulic control system for an accumulation conveyor capable of anti-singulation operation.

The invention will find application not only downstream of a sortation subsystem but wherever continuous product through-put with accumulation capability is desired. These and other objects, advantages and features of this invention will become apparent upon review of the following specification in conjunction with the drawings.

DESCRIPTION OF THE PREFERRED EMBODIMENT

Figure 1:
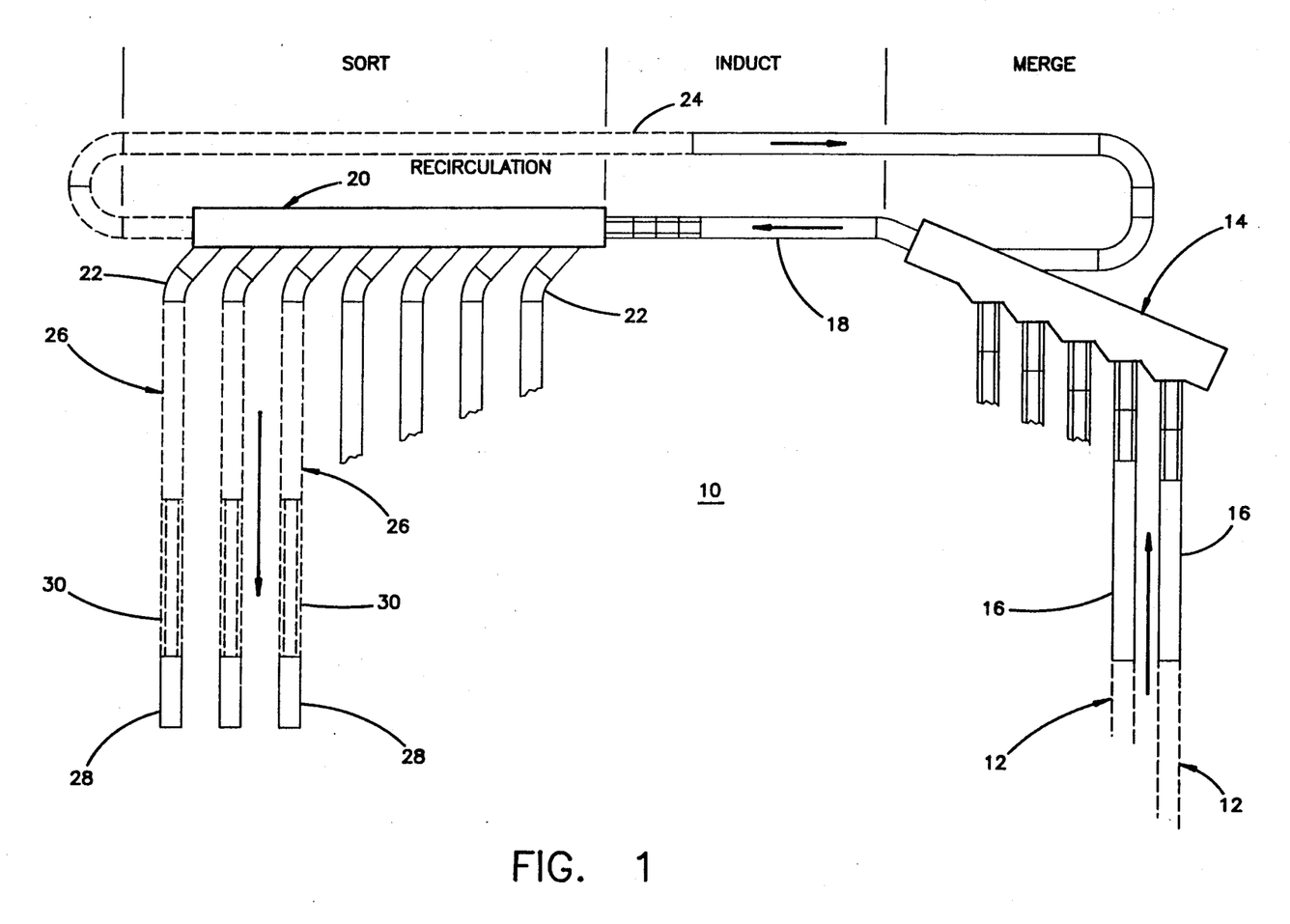
FIG. 1 is a schematic diagram of a conveyor system embodying the present invention.
Figure 2:
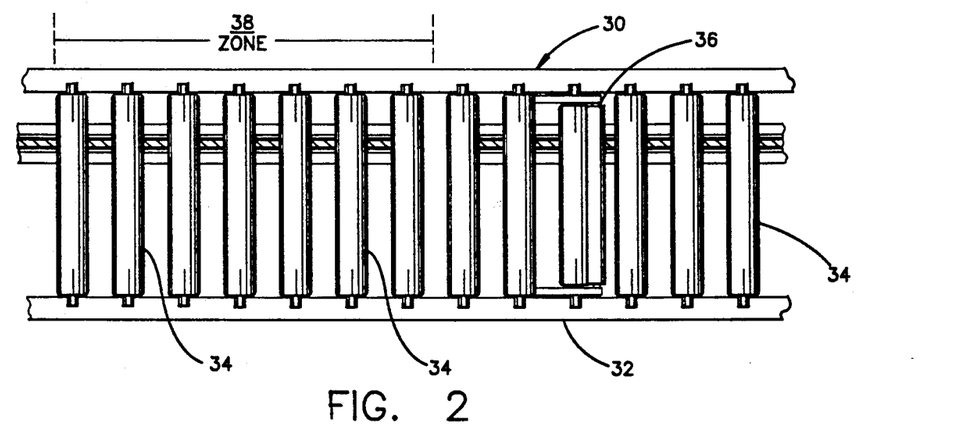
FIG. 2 is a top plan view of an accumulation conveyor useful with the present invention.
Figure 3:
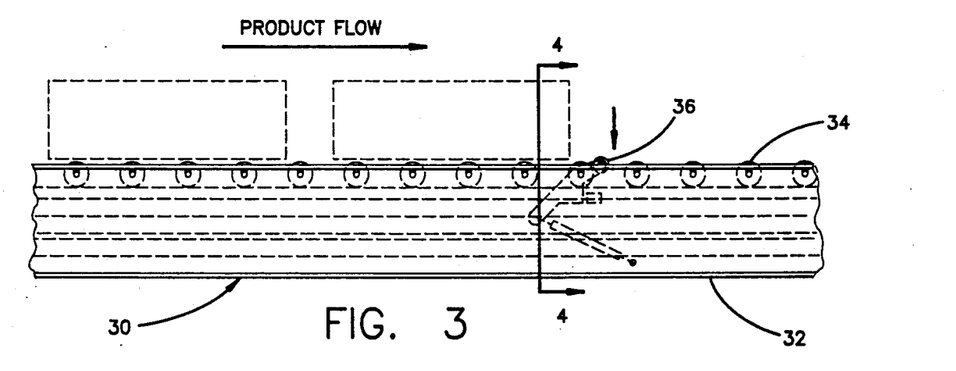
FIG. 3 is a side elevational of the conveyor in FIG. 2.

Referring now specifically to the drawings, and the illustrated embodiments depicted therein, a conveyor system 10 includes a plurality of inbound conveyors 12 for providing product to the conveyor system. Inbound conveyors 12 are joined at a merge section 14. In order to provide for an orderly merging of product from inbound conveyors 12, each inbound conveyor may include one or more accumulation conveyors 16. Each accumulation conveyor 16 accumulates inbound product behind a product stop (not shown) during an accumulation mode and individually discharges product to merge section 14 while other accumulation conveyors 16 accumulate product. Thus, accumulation conveyors 16 are said to be "slug discharge" conveyors because the product is allowed to accumulate at a slow rate and is discharged into merge section 14 as a group of cases at a fast rate.

From merge 14, product is conveyed through an induct section 18, where suitable spaces are inserted between adjacent cartons as required for proper sortation in a sortation section 20. At the sortation section 20, product is sorted onto individual spurs 22 according to the destination of the product, with each spur 22 dedicated at any particular time for product going to a particular customer. A supervisory control system (not shown) operating from bar code on the side of cases and information regarding customer orders and spur designations, determine which cases are sorted onto which spur. Product that cannot be sorted onto a spur 22, typically because the spur is overloaded with product, is recirculated to merge section 14 by a recirculation line 24. Because recirculated product tends to slow down the through-put of conveyor system 10, it is desirable to keep spurs 22 open as often as possible.

Each spur 22 leads to an outbound conveyor 26 for conveying of the sorted product to destination areas such as particular trucks o temporary storage. Each outbound conveyor 26 includes a constantly driven metering conveyor 28, such as a belt conveyor, for providing product to the destination at a rate that the individual person or equipment can handle. Each outbound conveyor 26 additionally includes an accumulation conveyor 30 immediately upstream of the metering conveyor 28. As will be apparent from the description given below, accumulation conveyor 30 may be of a length that is less than the total distance from sortation spur 22 to metering conveyor 28 or may extend the entire distance from spur 22 to metering conveyor 28.

Figure 4:
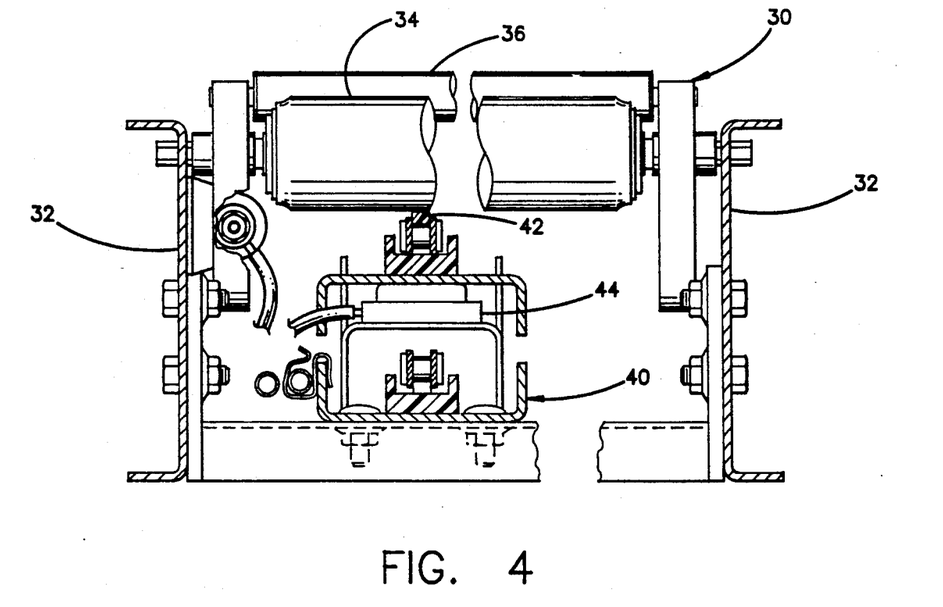
FIG. 4 is a sectional view taken along the lines IV—IV in FIG. 3 showing the accumulation conveyor in an activated mode.
Figure 5:
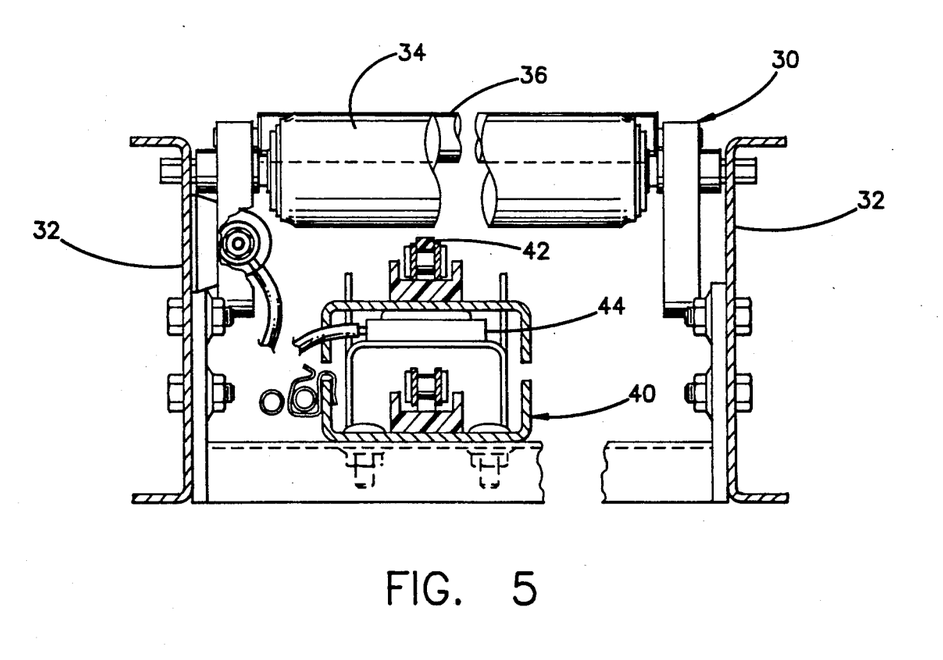
FIG. 5 is the same view as FIG. 4 showing the accumulation conveyor in a non-activated mode.

Accumulation conveyor 30 includes a frame 32 and a multiplicity of freely rotatable drive rollers 34 mounted in frame 32 (FIGS. 2–5). A plurality of sensing rollers 36 are positioned at space intervals along conveyor 30. A plurality of drive rollers 34 define a zone 38 and, in the illustrative embodiment, a sensing roller 36 associated with a particular zone 38 is positioned downstream of the zone. Each zone 38 further includes a drive belt assembly 40 having a continuously padded chain 42 and a pneumatic diaphragm 44. Chain 42 is continuously driven such that when pneumatic diaphragm 44 is actuated, chain 42 engages rollers 34 to drive the rollers, and hence product supported on the rollers, as seen in FIG. 4. When compressed air is not being supplied to diaphragm 44, chain 42 is spaced from rollers 34 such that rollers 34 are no longer driven, as illustrated in FIG. 5.

Figure 7:
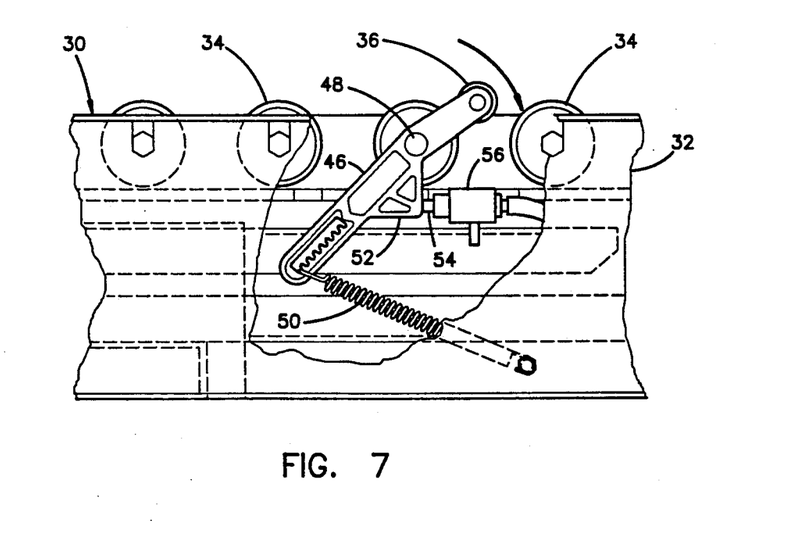
FIG. 7 is a partially sectioned side elevation of an accumulation conveyor showing additional details thereof.

Each sensing roller 36 is mounted to an arm 46 which is pivotally mounted at 48 (FIG. 7). A spring 50 biases bracket 48 counterclockwise and roller 36 upwardly. A lobe 52 is positioned on bracket 48 to engage an actuator 54 of a normally closed two-way pneumatic valve sensor 56. Accordingly, when a case is positioned over roller 36, lobe 52 is moved away from actuator 54 such that valve 56 is in an unactuated, normally closed position. When no case is positioned over sensing roller 36, as illustrated in FIG. 7, spring 50 biases lobe 52 against actuator 54 which actuates valve 56 into an open state.

Figure 6:
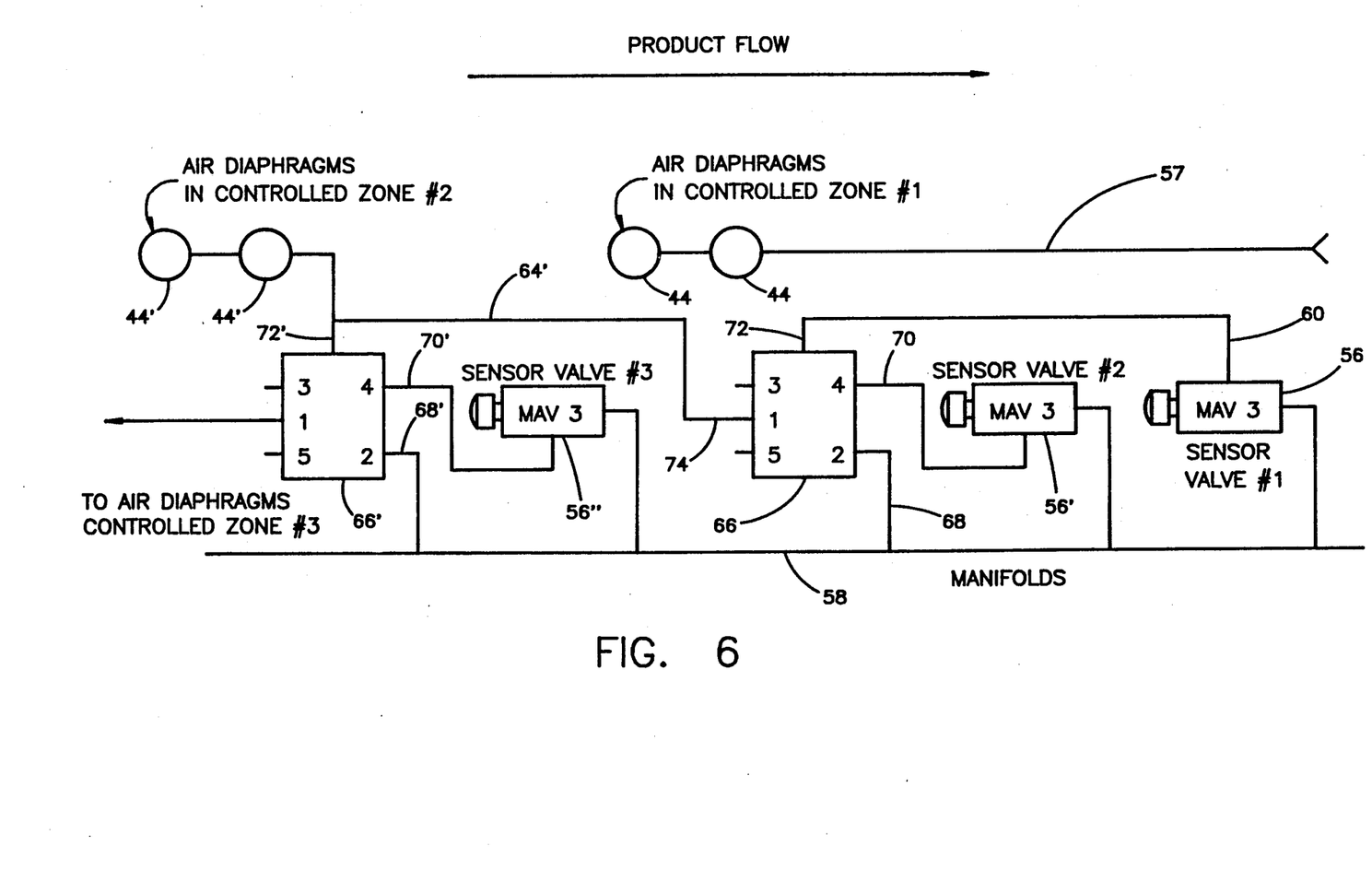
FIG. 6 is a schematic diagram of a pneumatic control system according to the invention.

Pneumatic diaphragms 44 in zone 1, which is the most downstream zone of conveyor 30 and is adjacent to metering conveyor 28, is connected directly with a line 57 that is selectively supplied with compressed air whenever the metering conveyor 28 is activated. Accordingly, whenever metering conveyor 28 is operating, the diaphragms 44 associated with zone 1 immediately upstream of its roller 36 are energized to cause zone 1 rollers 34 to be driven.

Sensor valve 56, associated with zone 1, is connected between a source of constant compressed air on line 58 to line 60. Zone 2, which is upstream of zone number 1, includes a pilot-controlled valve 66. Valve 66 includes a first inlet 68 connected with the constant air source of line 58 and a second inlet 70 connected with valve 56', associated with zone 2. A control, or pilot, input 72 of valve 66 is connected with line 64. Valve 66 additionally includes an output line 74. When pilot input 72 is supplied with compressed air from line 60, output 74 is connected with input 68, such that output 74 is continually pressurized irrespective of the condition of valve 56'. When input 72 is not pressurized because of the lack of compressed air on line 60, output line 74 is connected with input 70 such that output 74 is either pressurized or not pressurized depending upon the open or closed state of sensor valve 56'.

Accordingly, if line 60 is pressurized in response to zone 1 sensor valve 56 sensing the absence of product, output 74 from valve 66 is pressurized. If zone 1 sensor valve 56 senses a case on sensing roller 36 immediately adjacent the metering conveyor 28, output 74 of valve 66 will be pressurized by sensor valve 56' if there is no case on the sensing roller 36 for zone 2 but will not be pressurized if there is a case on the sensing roller 36 for zone 2. Output 74 extends to the pneumatic diaphragms 44' for zone number 2, such that when output 74 is pressurized, diaphragms 44' are actuated which causes the rollers in zone 2 to be driven. Output 74 from valve 66 associated with zone 2 is additionally supplied as an input 72' to valve 66' which is the pilot operated three-way valve associated with the air diaphragms for zone number 3 (not shown). Accordingly, if the diaphragms 44' for zone 2 are pressurized to drive the rollers in zone 2, the rollers in zone 3 will also be driven. If, however, the drive rollers in zone 2 are not being driven because line 74 is not pressurized, the drive rollers in zone 3 will be driven only if sensor valve 56" is open in response to the absence of product on the sensing roller associated with zone 3, and will not be driven if sensor valve 56" is closed in response to product actuating the sensing rollers for zone 3. In the illustrated embodiment, three-way valve 66 is commercially available and is marketed by Clippard Minimatic under Model FV-3 in combination with an MPA-7 miniature pilot actuator.

The above-described configuration of pilot operated valves and product sensing valves provided anti-singulation means. Thus, it may be seen that whenever any sensor roller 36 downstream of a particular zone is not being actuated by a product case, the zone is actuated. If, however, all of the sensing rollers downstream of a particular zone are covered with cases, then the drive rollers for that zone will be driven if the sensing roller for that zone is uncovered but will be not driven if the sensing roller is covered. Thus, it may be seen that the drive rollers 34 in any given zone will only be de-activated, in order to act as an accumulator, if there is essentially a continuous stream of product downstream of the particular zone. When, however, the drive rollers in a zone are activated, they receive activating pressure from source 58 either directly through pilot actuated valve 66 or through pilot actuated valve 66 and the associated sensor valve 56. There are never more than two valve movements between any air diaphragm 44 and source 58. As a result, all actuations of diaphragms 44 are "crisp" and not sluggish.

In operation, as sortation section 20 diverts product on spurs 22, the product moves along outbound conveyor 26 and onto accumulation conveyor 30. As the product moves along accumulation conveyor 30, it is propelled without interruption provided that there is at least one open zone ahead of it. Because the driven rollers are not interrupted, there is no singulation between cases as they proceed along accumulation conveyor 30. If, however, metering conveyor 28 cannot keep up with the flow from accumulation conveyor 30, product will begin to accumulate on conveyor 30 with zones progressively becoming de-actuated beginning with zone 2. When zone 1 becomes clear, the remaining zones will be driven to move the product forward until zone 1 is again full. Whenever a sensing roller 36 becomes open, all upstream zones are driven. Thus, it is seen, a sensor roller that is not being depressed by a case divides conveyor 30 into an accumulation section downstream of the open roller and a driven conveyor section upstream of the open roller.

Therefore, it is seen that accumulation conveyor 30 differs from accumulation conveyor 16 in that accumulation conveyor 30 is "slug charge" in that it is capable of handling a large rate of product from sortation section 20 and feeding the product to metering conveyor 28 without providing singulation between cases. In contrast, accumulation conveyor 16 is "slug discharge" and requires signals from merge section 14 indicating when to discharge and when to accumulate. However, the improved non-singulation means of the present invention will find application in accumulation conveyor 16. Accumulation conveyor 30 is fully automatic and responds to the flow of product from sortation section 20 to efficiently propel the containers to metering conveyor 28. This increases through-put of the system without increasing line speed by making maximum use of the line speed of conveyor 30. Because the outbound conveyor 26 is capable of handling a greater flow of product, fewer product must be recirculated which increases the through-put of the entire system. Accumulation conveyor 30 will find application wherever it is desired to provide accumulation capability in a manner that does not diminish product throughput. Additionally, certain conveyor systems may use other product handling means at the discharge end of outbound conveyor 26 such as product stackers. In such systems, conveyors 30 will function as a more conventional slug discharge accumulation conveyor.

Figure 8:
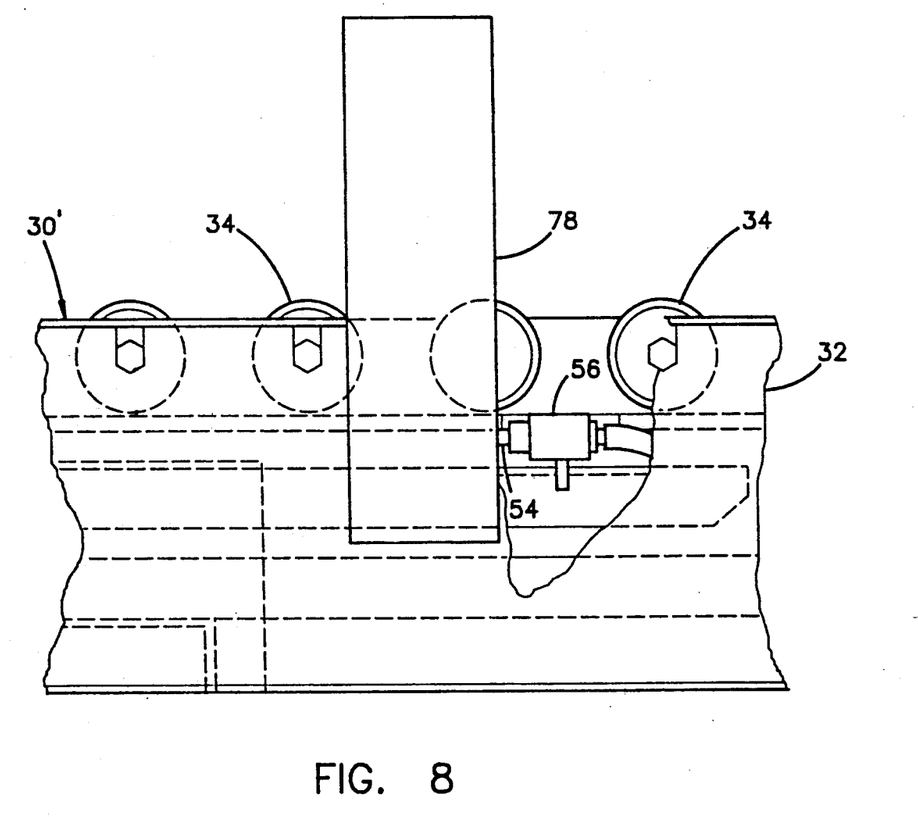
FIG. 8 is the same view as FIG. 7 of an alternative embodiment.

Changes and modifications in the specifically described embodiments can be carried out without departing from the principles of the invention. For example, although the invention is illustrated in FIGS. 2 through 5 as using product sensor rollers, various non-contact sensors 78, such as photo-detectors and proximity sensors may be used to actuate the control valves 56 (FIG. 8). When the invention is applied in this manner, it has the additional advantage of providing the ability to accumulate product that is too light to actuate pressure rollers and to accumulate such lightweight product with "zero" line pressure, i.e. the pressure placed on each product by the adjacent product. Furthermore, other product drive means, as are known in the art, may be substituted as would be recognized by the skilled artisan. The protection afforded the invention is intended to be limited only by the scope of appended claims, as interpreted according to the principles of patent law including the Doctrine of Equivalents.

The embodiments of the inventions in which an exclusive property or privilege is claimed are defined as follows:

1. In a conveyor system having a sortation system including means or directing product selectively to a plurality of outbound conveyors and an accumulation conveyor in at least one of said outbound conveyors downstream of said sortation system, said accumulation conveyor comprising:

a multiplicity of conveying rollers for supporting product and being rotatable for conveying said cases, said rollers being grouped into adjacent zones;

driving means associated with each of said zones that is actuable for rotating the rollers in that zone;

product sensing means associated with each of said zones for sensing product in the vicinity of that zone;

control means associated with each of said zones for actuating the driving means of that zone if the product sensing means for that zone does not sense the presence of product;

said control means further being responsive to said product sensing means downstream of the associated zone in order to actuate the driving means of that zone if any of said product sensing means downstream of that zone do not sense the presence of product in order to produce a transport portion in which all zones upstream of the empty zone are actuated to transport product without singulation of any upstream grouped product; and     wherein said control means deactivates the driving means of the associated zone if said product sensing means for that zone and all of said product sensing means downstream of that zone sense the presence of product in order to produce an accumulation portion in which no zones are actuated, whereby an interface between zones in said accumulation portion and zones in said transport portion is dynamically shifting in response to product movement along said accumulation conveyor to provide product accumulation without singulation.

2. The conveyor system in claim 1 wherein said product sensing means associated with each of said zones is positioned within the immediately downstream zone.

3. The conveyor system in claim 1 wherein said product sensing means includes a sensing roller positioned between said conveying rollers.

4. The conveying system in claim 1 wherein said control means includes a control valve responsive to one of said sensing means and a pilot actuated valve having a pilot port connected for concurrent actuation with the conveying means that is immediately downstream of said one of said sensing means, said pilot actuated valve having an output connected with the conveying means associated with said one of said sensing means for selective actuation thereof and a pair of input ports selectively engaging said output port in response to whether said pilot ports is being actuated, one of said input ports being connected with said control valve responsive to said one of said sensing means and the other of said input ports being connected with a source of fluid.

5. In a conveyor system including an accumulation conveyor, an upstream product input to said accumulation conveyor and a downstream product output from said accumulation conveyor, said accumulation conveyor comprising:
   a multiplicity of conveying rollers for supporting product and being rotatable for conveying said product, said rollers being grouped in adjacent zones;
   driving means associated with each of said zones that is actuatable by actuating fluid for rotating the rollers in that zone;
   product sensing means associated with each of said zones for sensing product in the vicinity of that zone;
   control means associated with each of said zones for supplying actuating fluid to actuate the driving means of that zone if the product sensing means for that zone does not sense the presence of product;
   said control means further including anti-singulation means responsive to said product sensing means downstream of the associated zone in order to actuate the driving means of that zone if any of said product sensing means downstream of that zone do not sense the presence of product in order to produce a transport portion in which all zones upstream of the empty zone are actuated to transport product without singulation of any upstream grouped product;
   wherein said anti-singulation means deactivates the driving means of the associated zone if said product sensing means for that zone and all of said product sensing means downstream of that zone sense the presence of product in order to produce an accumulation portion in which no zones are actuated, whereby an interface between zones in said accumulation portion and zones in said transport portion is dynamically shifting in response to product movement along said accumulation conveyor to provide product accumulation without singulation; and
   wherein said anti-singulation means includes means for connecting said driving means directly to a source of actuating fluid.

6. The conveyor system in claim 5 wherein said product sensing means associated with each of said zones is positioned within the immediately downstream zone.

7. The conveyor system in claim 5 wherein said product sensing means includes a sensing roller positioned between said conveying rollers.

8. The conveyor system in claim 5 wherein said product sensing means includes a non-contact sensor.

9. In a conveyor system having an accumulation conveyor, an upstream product input to said accumulation conveyor and a downstream product output from said accumulation conveyor, said accumulation conveyor comprising:
   a plurality of conveying means arranged in tandem and selectively actuatable for conveying product from said input to said output;
   product sensing means associated with each of said conveying means for sensing the presence of product in the vicinity of the associated said conveying means; and
   control means responsive to said product sensing means and adapted to selectively actuating each of said conveying means, said control means including a plurality of control valves and a plurality of pilot actuated valves, each control valve being responsive to one of said sensing means and having an associated pilot actuated valve, each pilot actuated valve having a pilot port connected for concurrent actuation with the conveying means that is immediately downstream of the sensing means associated with that particular pilot actuated valve, each said pilot actuated valve having an output connected with the conveying means associated with the associated said sensing means and a pair of input ports selectively engaging said output port in response to whether said pilot port is being actuated, one of said input ports being connected with said control valve responsive to the associated said sensing means and the other of said input ports being connected with a source of actuating fluid, whereby all conveying means upstream of a said conveying means whose associated sensing means is not sensing product are actuated to transport product without singulation of any upstream grouped product and, whereby said control means deactivates a conveying means if the associated sensing means and all of the sensing means downstream of that sensing means sense the presence of product.

10. The conveyor system in claim 9 wherein said sensing means is a roller that is sensitive to contact by a product case.

11. The conveyor system in claim 9 wherein said sensing means is a non-contact sensor.

12. The conveyor system in claim 9 wherein each of said conveying means includes a plurality of adjacent selectively powered rollers.

13. A conveying system comprising:
   a metering conveyor adapted to receiving packages at a generally constant rate, a feed conveyor that is adapted to supplying packages to said metering conveyor at least momentarily at a rate that is higher than said generally constant rate, and an accumulating transport conveyor between said feed conveyor and said metering conveyor;

said accumulating transport conveyor including a plurality of conveying means arranged in tandem and a control for said conveying means, each conveying means being actuatable by said control for conveying packages from said spur to said metering conveyor; and said control including sensing means or sensing packages along said accumulating transport conveyor and for continuously actuating each said conveyor means in a transport mode in order to transport packages at a generally constant speed from said spur to said metering conveyor when supply is less than demand and selectively automatically switching individual ones of said conveying means to an accumulation mode only when packages arrive at said metering conveyor at a rate greater than said constant rate in order to accumulate packages arriving at said greater rate whereby portions of said accumulating transport conveyor dynamically change between accumulate mode and transport mode, to avoid singulation of any grouped packages being transported upstream of any empty conveying means while accumulating excess packages downstream of said empty conveying means.

14. The conveying system in claim 13, wherein said control discontinues activating conveyor means for which all ones of said sensing means downstream thereof sense the presence of packages.

15. In a conveyor system including an accumulation conveyor, an upstream product input to said accumulation conveyor and a downstream product output from said accumulation conveyor, said downstream product output operating at a generally constant rate and said upstream product input capable of operating at least momentarily at a rate that is greater than said generally constant rate, said accumulation conveyor comprising:

a multiplicity of conveying rollers for supporting product and being rotatable for conveying said product, said rollers being grouped in adjacent zones;

driving means associated with each of said zones that is actuatable for rotating the rollers in that zone;

product sensing means associated with each of said zones for sensing product in the vicinity of that zone;

control means associated with each of said zones for actuating the driving means of that zone if the product sensing means for that zone does not sense the presence of product;

said control means further including anti-singulation means responsive to said product sensing means downstream of the associated zone in order to actuate the driving means of that zone if any of said product sensing means downstream of that zone do not sense the presence of product in order to produce a transport portion in which all zones upstream of the empty zone are actuated to transport product without singulation of any upstream grouped product; and wherein said anti-singulation means deactivates the driving means of the associated zone if said product sensing means for that zone and all of said product sensing means downstream of that zone sense the presence of product in order to produce an accumulation portion in which no zones are actuated, whereby an interface between zones in said accumulation portion and zones in said transport portion is dynamically shifting in response to product movement along said accumulation conveyor to provide product accumulation without singulation.

* * * * *

UNITED STATES PATENT AND TRADEMARK OFFICE
CERTIFICATE OF CORRECTION

PATENT NO. : 5,191,967

DATED : March 9, 1993

INVENTOR(S) : Bernard H. Woltjer and Arthur J. Terpstra, Jr.

It is certified that error appears in the above-identified patent and that said Letters Patent is hereby corrected as shown below:

```
Column 3, line 59:
   "trucks o" should be --trucks or--.

Column 9, claim 13, line 10:
   "means or" should be --means for--.
```

Signed and Sealed this

Eighth Day of March, 1994

Attest:

BRUCE LEHMAN

Attesting Officer    Commissioner of Patents and Trademarks